United States Patent Office 3,684,635
Patented Aug. 15, 1972

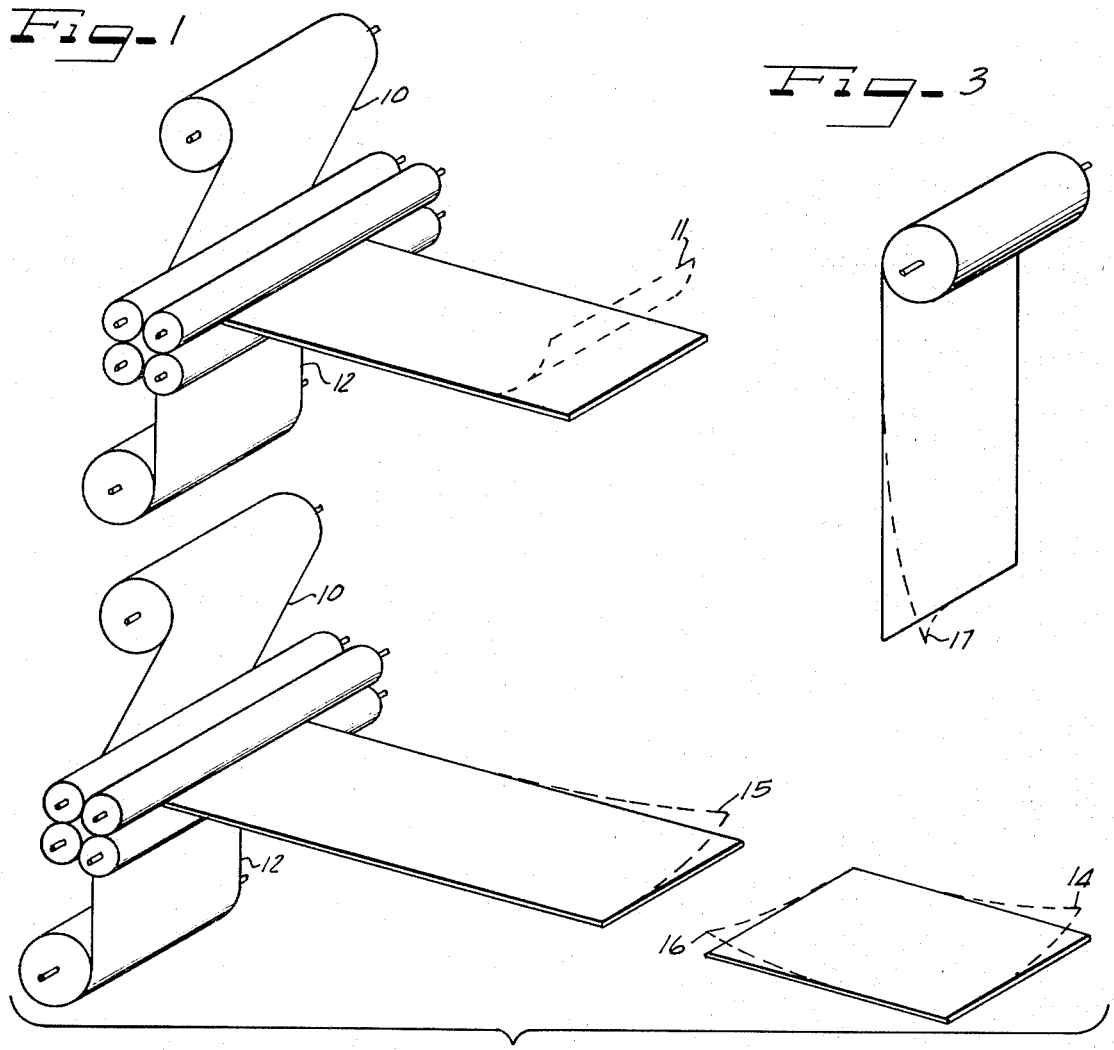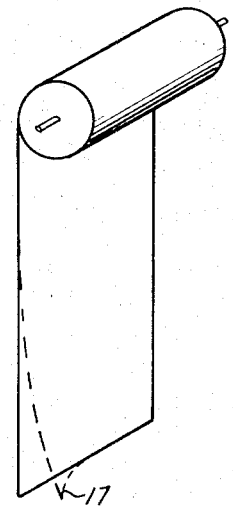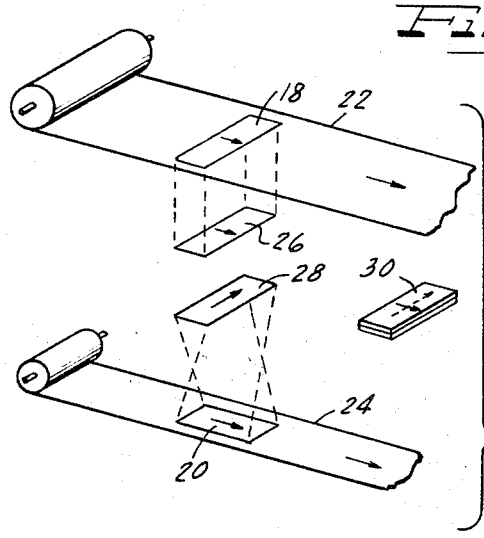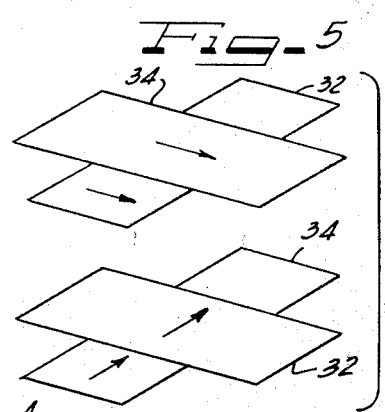

3,684,635
WARP-FREE LAMINATES OF FILM AND PRODUCT COMBINATIONS AND METHOD OF MAKING SAME
Henry N. Staats, Deerfield, Ill., assignor to General Binding Corporation, Northbrook, Ill.
Continuation-in-part of abandoned application Ser. No. 884,837, Dec. 15, 1969. This application Aug. 17, 1970, Ser. No. 64,405
Int. Cl. B32b 7/00, 27/10
U.S. Cl. 161—43    11 Claims

ABSTRACT OF THE DISCLOSURE

Covers a method of laminating an object utilizing a film comprising a combination of polyethylene terephthalate thermoplastic resin such as polyethylene to provide substantially warp-free laminates. The process is carried out by providing two pieces of polyethylene terephthalate and thermoplastic resin films which have been cut from supply film in a longitudinally perpendicular manner with respect to one another. The object to be laminated is inserted between the films which are now placed in a dimensionally aligned arrangement in a manner such that the heat-fusible thermoplastic resin or adhesive side of each film contacts the object. The laminating process is then completed by appliaction of pressure and heat to the film layers carrying the object. The invention also covers an improved laminate article derived from the above process.

CROSS-REFERENCES TO RELATED APPLICATIONS

This is a continuation-in-part of my application bearing Ser. No. 884,837, filed Dec. 15, 1969 now abandoned.

BACKGROUND OF THE INVENTION

Field of the invention

This invention is concerned with the laminating art in which objects are heat-sealed in a plastic film envelope.

Description of the prior art

The use of polyester film carriers, and particularly polyethylene terephthalate (Mylar) in combination with heat-reactivatible coatings and preferably polyethylene adhesive has been extended quite widely in the past decade as a useful laminating material. Carrier-coating thickness relationships vary widely in these films depending upon the end use. For example, carrier may range from about ½ mil when used with about 1 mil coating to about a 5 mil carrier when used with a 7 mil coating. The thinner combinations are generally used for documents or ordinary paper, whereas thicker film combinations are used for wallet-sized identification or data processing cards.

It is quite desirable to produce flat laminates in all gauges of film and product combinations. As a minimum requirement this is desirable from an esthetic standpoint. In the case of identification or data processing cards, it is essential that they be flat since they generally must be introduced into reading devices. Deviations from flatness may introduce reading errors and in extreme cases prevent entry of the card into the reading machines.

However, to date, a vast majority of laminated articles, such as those produced from polyethylene terephthalate-polyethylene films are not completely flat. In many instances, the laminate articles exhibit a tendency to curl. However, this defect can usually be eliminated by proper tension adjustment of the film webs comprising the ultimate film envelope, prior to the lamination operation.

In other instances, a more serious and extremely difficult to control defects occurs known as warp wherein one edge deviates upward or downward from the theoretical norm. In further situations, both phenomena may occur. Such deviations from flatness cause the just-mentioned problems, particularly with cards placed in reading machines or used in conjunction with computers. As noted above, in extreme situations of curl and/or warp the card will be rejected from the machine.

It would therefore be a substantial advance in the art if a laminating method were discovered which provided laminate articles which exhibit little or no tendency to warp. Such a method would be extremely useful in producing flat identification and data processing cards fed into machines such as computers. The flat character of the card would prevent reading errors and/or rejection by the machines.

SUMMARY

In view of the above, a new method of laminating films comprised of polyethylene terephthalate and an adhesive or thermoplastic resin polyethylene has been provided whereby the particular problem of warp in the resultant laminate articles has been overcome. Substantially warp-free laminates are produced via this process by first providing two pieces of polyethylene terephthalate-adhesive supply film which have been cut in a longitudinally perpendicular manner with respect to one another. The films are then placed in a dimensionally aligned arrangement and the object to be laminated inserted between the films. The films are placed in contact with the object in a manner such that the heat-fusible or heat-reactivatable thermoplastic side of each film contacts the object. The laminating process is then completed in the conventional manner by application of pressure and heat to the film layers carrying the object.

The invention is also concerned with an improved laminate article derived from the above process. The substantially warp-free article comprises a laminated object contained in a laminating envelope of polyethylene terephthalate heat-reactivatable adhesive film. The film has been previously derived from supply film in the manner set out above.

It therefore becomes an object of the invention to provide an improved method of laminating articles.

A more specific object of the invention is to provide a method of laminating articles with films made up of a combination of polyethylene terephthalate and an adhesive which is heat-reactivatable whereby the resultant laminates are substantially warp-free.

Yet another object of the invention is to achieve the above aim without resort to costly new and sophisticated apparatus, and by use of a number of conventional and presently available laminating apparatuses.

A still further object of the invention is to provide an improved laminate article derived from the method of the invention.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 diagrammatically illustrates the prior art problem of curl;

FIG. 2 graphically illustrates the more difficult problem to solve of warping in laminated articles;

FIG. 3 illustrates the concept of film warp before the laminating process has been effected;

FIG. 4 is a graphic illustration of the key step in the invention obviating the problem of warp; and FIG. 5 graphically illustrates how flatness of laminate articles is theoretically obtained via the process of the invention.

DESCRIPTION OF THE PREFERRED EMBODIMENTS

In order to more fully understand the prior art problems of curl and warp prevalent with respect to previous laminate articles, the reader's attention is drawn to FIGS. 1–3. While for convenience sake, description of these problems and their solution here is centered around polyethylene terephthalate-polyethylene laminates, it is understood, of course, that the same is applicable to any laminate film comprised of polyethylene terephthalate and a thermoplastic resin, that is, a heat-reactivatable adhesive typified by polyethylene.

FIG. 1 illustrates the phenomena defined as curl present in a typical laminate presenting this problem, here a polyethylene terephthalate-polyethylene laminate. This is illustrated in exaggerated form and occurs regardless of the type of laminating machine employed. Curl is normally the result of uneven tension between film webs 10 and 12. As specifically shown in FIG. 1, the film tension and film web 10 is higher than web 12 since the composite film curls upwardly as shown at 11. Correspondingly, if film web 12 contained higher tension than web 10, the composite film would curl downwardly. As noted above, if the tension in both films were adjusted to be equal, the problem of curl is eliminated.

FIG. 2 illustrates another more serious defect in prior art laminate articles, defined as warp. As illustrated here, one edge deviates upwardly as shown at point 15 or downwardly from the theoretical norm. The fact of the existence of warp can be confirmed by cutting a laminated web into small portions, typically, into identification card size. The portions then become doubly warped. One corner deviates upwardly as at 14 in FIG. 2 and the diagonally opposite corner also deviates upwardly as at 16 in FIG. 2.

At one time it was thought that the laminating machine itself was responsible for the phenomenon of warp. However, repeated tests indicate that the amount of warp is not consistent and varies from dead flat to a measurable deflection of as much as ¼ inch at each corner. Subsequent investigations determined that the warp varied from batch to batch of film composite. As shown in FIG. 3, the warp as at point 17 can be observed in almost any thickness combination of polyethylene terephthalate-polyethylene prior to laminating.

It is now felt here that warp in the film composite is caused by residual bi-axial stresses in the original carrier of polyethylene terephthalate where the longitudinal-tension stress is greater than the transverse-tension stress. Application of molten polyethylene may even exaggerate the difference. The fact that there is a directional difference in stresses is more or less confirmed by the physical behavior of unlaminated composite as shown in FIG. 3.

It has also been discovered here that the film can be deflected manually and take either position. Thus, if a single composite film can warp in either direction and is combined with another single composite which can also warp in either direction, the result is still a warped laminate. On the other hand, if single composites warped in only one direction it would be theoretically possible to combine two composites in such a manner as to balance out the warp and obtain a dead flat laminate. However, this is not the situation.

The gist of the invention involving the key step in the method outlined here is best illustrated in FIG. 4. Here, as is shown, two strips of polyethylene terephthalate-polyethylene film 18 and 20 are respectively cut from two separate supply sources 22 and 24. The arrows in these film sources designate the process direction. The films are cut from the supply sources in a longitudinally perpendicular manner with respect to one another. The cutting operation is best carried out by cutting each of the two pieces of film in a size larger than the indicia-bearing card or other object to be inserted between. Of course, while the films are cut in a longitudinal perpendicular manner with respect to each other, the dimensions of the die cut are exactly the same in both instances. Thus, the films can then be placed in a dimensionally aligned arrangement as films 26 and 28, before the object is inserted between them. The films are so positioned that the heat-reactivatable polyethylene sides oppose one another and contact the object to constitute a "sandwich" 30 to be laminated.

In one embodiment of the invention, heat may be applied discretely in several spots near the edges of the film so that the films are heat-stitched together. Room is left to insert an indicia-bearing card at a later time. In another embodiment, the films are not heat-stitched together but immediately placed above and below the object which is then laminated.

While FIG. 4 illustrates the embodiment of cutting both pieces of film from different rolls or supply sources, it should be understood, of course, that both strips of film may be cut from a single supply source, though in a longitudinally perpendicular manner with respect to each other.

The laminating process is then completed by application of pressure and heat to the film layers carrying the object whereby a laminate article is provided. Of course, in the situation where the films have already been heat-stitched, a card is first inserted therein, and heat and pressure are applied in a laminator resulting in the laminated card.

This laminated article, provided as described above, is exactly identical in appearance to those which are produced in the more conventional manner. In the latter procedure, the card-bearing indicia is introduced into a laminating machine which applies the film to both sides of the card. A border of film-to-film is retained. Thus, the card is film-bonded to both sides and is encapsulated by virtue of the border. Next, the web is introduced into a die-cutting machine and the laminated card (and its border) is cut from the web.

While it is not exactly understood why warping occurs and is obviated in the process of the invention, it is believed that the following takes place. The two films making up the laminate envelope contain a small amount of pre-laminated warp which undoubtedly contributes warp to the finished card. However, in addition, it is believed that the subsequent heating during the lamination greatly increases the warp. It is thought that during the hot laminating process the film shrinks more in the longitudinal direction (or process direction) than the transverse direction.

Thus, when two pieces of film are laminated together with both oriented so that the longitudinal stress in both are in the same direction, the resultant laminate will always be warped in either direction. However, as two pieces of film are laminated together with a longitudinal stress direction of one film perpendicular to the longitudinal stress direction of the other, the resultant laminate will not contain warp. This objective is achieved as shown in FIG. 4 where pieces of film are cut in a longitudinally perpendicular manner with respect to one another before being laminated.

It is further thought that a warp-free laminate article as obtained here is dependent upon the fact that when the two films are oriented perpendicularly in a stresswise manner, the high shrink stress of one film is restrained or minimized by the low shrink stress of the other film. The converse is also true. This concept is illustrated in FIG. 5 wherein due to the cutting of the film the high shrink tendencies of one film is minimized by the low shrink tendencies of the other film by the perpendicular orientation. Thus, the low shrink stress of film 32 is minimized by the high shrink stress of film 34 and vice versa.

As noted above, any thermoplastic resin may be combined with polyethylene terephthalate film to constitute a laminating material free from a tendency to curl and warp. Included within the definition of suitable thermoplastic resins are hydrocarbon polymers such as polyethylene, other polyolefins and copolymers of ethylene with 1-olefins, polystyrene, polyvinyl halides, polyvinylidene halides, polyacrylates, including inter alia polymethylmethacrylate, linear polycarbonamides made by the intermolecular polymerization of linear diamines containing from six to ten carbon atoms with linear dicarboxylic acids containing from two to ten carbon atoms and their amide-forming derivatives and the super polyamides made by the intramolecular polymerization of omega-aminos as containing from four to twelve carbon atoms and their amide-forming derivatives, such as polyhexamethyleneadipamide, polyhexamethylenesebacamide, and polycaprolactam, polycarbonimides, polyethers, polycarbonates and polyoxyalkylenes, such as high molecular weight, thermally stable polyoxymethylene.

Typical thermoplastic or heat-reactivatable adhesives used in combination with polyethylene terephthalate include polyethylene and copolymers thereof such as an ethylene-ethyl acrylate copolymer. Most preferred adhesives include polyethylene itself or its interpolymers.

The following example illustrates a typical method of preparing a warp-free laminate within the scope of the invention. It is understood, of course, that this example is merely illustrative, and that the invention is not to be limited thereon.

EXAMPLE I

From two supply sources of a film comprising polyethylene adhesive extruded as a coating on a polyethylene terephthalate carrier, two film strips were cut. The films were cut in a longitudinally perpendicular manner with respect to one another and then placed in a dimensionally aligned arrangement. Thereafter, the films were heat-stitched, leaving enough room for an article to be inserted.

The particular laminating films here comprised a bottom polyethylene layer 6 mils thick and a top polyethylene terephthalate layer 5 mils thick. The films were so heat-stitched together that the polyethylene layer was on the inside of the pouch on both the top and bottom portions.

Thereafter, a card stock was inserted into the pouch or envelope to constitute a "sandwich." In this instance, the card stock contained an identification photograph. The card itself was roughly 10–12 mils in thickness leading to an overall thickness of film and card stock of 30–32 mils, well within normal specification.

The film envelope containing the card was then fed into the laminating machine by means of pressure rollers, heated to a temperature of about 275–325° F. to melt the polyethylene, and thereafter inserted through spring pressure rolls to complete the lamination procedure.

EXAMPLE II

Here, the method of Example I was carried out in an exact manner with the exception that the adhesive extruded on the polyethylene terephthalate carrier in this instance was a high molecular weight ethylene-ethyl acrylate copolymer. Again, the films were placed with respect to one another as described therein. The resultant card also exhibited substantially no warp deflection.

The card was then examined with respect to warp and was found to have less than a 1/64" deflection. This should be compared to laminates derived from prior art laminating processes in which one notes as high as 1/4" warp deflection. In the prior art procedures, of course, the films are not cut in a longitudinally perpendicular manner with respect to one another, a key concept of the invention here.

Thus, warp-free improved laminate articles may be obtained in accordance with the directions set out above. These articles broadly comprise the object to be laminated contained in a laminating envelope film, said envelope having been derived from two pieces of film cut in a longitudinally perpendicular manner with respect to one another. The laminating film envelope, of course, is the polyethylene terephthalate-polyethylene film combination.

I claim as my invention:

1. A method of laminating polyethylene terephthalate films combined with a heat-reactivatable adhesive to provide substantially warp-free laminates which comprises the steps of cutting two pieces of said film from supply film in a longitudinally perpendicular manner with respect to one another, inserting the object to be laminated between said films which are first placed in a dimensionally aligned arrangement with the heat-reactivatable adhesive side of each film contacting said object, and applying pressure and heat to the films carrying said object to laminate said films to said object.

2. The method of claim 1 wherein said adhesive is a homopolymer of ethylene.

3. The method of claim 1 wherein said adhesive is a ethylene copolymer.

4. The method of claim 3 wherein said copolymer is an ethylene-ethyl acrylate copolymer.

5. An improved laminated article particularly characterized as being substantially warp-free which comprises the object to be laminated contained in a laminating envelope, said envelope comprising two pieces of a film comprising a combination of polyethylene terephthalate and an adhesive having the longitudinal stress longitudinally perpendicular with respect to one another.

6. A method of laminating polyethylene terephthalate-polyethylene-polyethyl acrylate copolymers in combined film form to provide substantially work-free laminates which comprises the steps of cutting two pieces of said film from supply film of this type in a longitudinally perpendicular manner with respect to one another inserting the object to be laminated between said films which are first placed in a dimensionally aligned arrangement with the heat-fusible polyethylene-polyethyl acrylate copolymer side of each film contacting said object, and applying pressure and heat to the films carrying said object to laminate said films to said object.

7. The method of claim 1 wherein said film pieces are first heat-stitched together adjacent an edge thereof prior to lamination, leaving sufficient room between stitches to insert the object to be laminated.

8. An improved laminated article particularly characterized as being substantially warp-free which comprises the object to be laminated contained in a laminating envelope, said envelope comprising two pieces of a film comprising a combination of polyethylene terephthalate and a polyethylene-polyethyl acrylate copolymer having the longitudinal stress longitudinally perpendicular with respect to one another.

9. A method of laminating polyethylene terephthalate-polyethylene films to provide substantially warp-free laminates which comprises the steps of cutting two pieces of a polyethylene terephthalate-polyethylene film from supply polyethylene terephthalate-polyethylene film in a longitudinally perpendicular manner with respect to one another, inserting the object to be laminated between said films which are first placed in a dimensionally aligned arrangement with the heat fusible polyethylene side of each film contacting said object, and applying pressure and heat to the films carrying said object to laminate said films to said object.

10. The method of claim 9 wherein said film pieces are first heat-stitched together adjacent an edge thereof prior to lamination, leaving sufficient room between stitches to insert the object to be laminated.

11. An improved laminated article particularly characterized as being substantially warp-free which comprises the object to be laminated contained in a laminating envelope, said envelope comprising two pieces of polyethylene terephthalate-polyethylene film having the longitudinal stress longitudinally perpendicular with respect to one another.

References Cited

UNITED STATES PATENTS

| 3,586,593 | 6/1971 | Dahl, Jr. | 161—55 X |
| 3,414,998 | 12/1968 | Berger | 40—2.2 |
| 3,279,826 | 10/1966 | Rudershausen et al. | 40—2.2 X |
| 3,471,353 | 10/1969 | Rasmussen | 161—55 X |

FOREIGN PATENTS

| 6,502,691 | 9/1965 | Netherlands | 161—402 |
| 1,287,795 | 1/1969 | Germany | 161—402 |

PHILIP DIER, Primary Examiner

U.S. Cl. X.R.

40—2.2; 156—264, 292; 161—55, 146, 250, 402; 283—7